US010620623B2

(12) United States Patent
Ohlarik et al.

(10) Patent No.: US 10,620,623 B2
(45) Date of Patent: Apr. 14, 2020

(54) UAV FLIGHT CONTROL SYSTEM

(71) Applicant: Verizon Patent and Licensing Inc., Arlington, VA (US)

(72) Inventors: Derek Wade Ohlarik, Flemington, NJ (US); Mauricio Pati Caldeira de Andrada, South Plainfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 253 days.

(21) Appl. No.: 15/389,537

(22) Filed: Dec. 23, 2016

(65) Prior Publication Data
US 2018/0181115 A1 Jun. 28, 2018

(51) Int. Cl.
*G05D 1/00* (2006.01)
*B64C 39/02* (2006.01)
*G05D 1/10* (2006.01)

(52) U.S. Cl.
CPC ......... *G05D 1/0016* (2013.01); *B64C 39/024* (2013.01); *G05D 1/102* (2013.01); *B64C 2201/146* (2013.01)

(58) Field of Classification Search
CPC . B64C 15/02; B64C 2201/146; B64C 39/024; G05D 1/0016; G05D 1/042; G05D 1/0808
USPC .......................................................... 701/2
See application file for complete search history.

(56) References Cited

U.S. PATENT DOCUMENTS

| 5,158,495 A * | 10/1992 | Yonezawa | A63H 29/22 446/454 |
| 7,438,148 B1 * | 10/2008 | Crea | B62D 1/00 180/167 |
| 9,550,561 B1 * | 1/2017 | Beckman | B64C 17/00 |
| 9,663,227 B1 * | 5/2017 | Lema | B64C 39/024 |
| 9,927,812 B2 * | 3/2018 | Wang | G05D 1/0016 |
| 2012/0226394 A1 * | 9/2012 | Marcus | A62B 5/00 701/2 |
| 2012/0232718 A1 * | 9/2012 | Rischmuller | A63H 27/12 701/2 |
| 2014/0054412 A1 * | 2/2014 | Guetta | B64B 1/50 244/33 |
| 2015/0202540 A1 * | 7/2015 | Erhart | A63H 30/04 340/12.5 |
| 2015/0353206 A1 * | 12/2015 | Wang | B64F 1/00 244/114 R |
| 2015/0370256 A1 * | 12/2015 | Erhart | A63H 30/04 701/2 |

(Continued)

*Primary Examiner* — Angelina Shudy

(57) ABSTRACT

A system includes a UAV with at least three rotors, a flight controller on the UAV, and a pistol-grip-style transmitter to receive operator input for controlling the UAV. The transmitter includes (1) a speed trigger for controlling a linear speed of the UAV, (2) a steering wheel for performing left or right turns by the UAV, (3) an altitude slider for controlling a flying altitude of the UAV, and (4) a communication interface to send control signals indicating relative positions of the speed trigger, the steering wheel, and the altitude slider. The flight controller includes a processor to receive, from the transmitter, the control signals indicating the relative positions of the speed trigger, the steering wheel, and the altitude slider. The processor adjusts, in response to the control signals, a rotational speed of each rotor independently to implement the operator input for forward-facing flight.

19 Claims, 8 Drawing Sheets

(56) References Cited

U.S. PATENT DOCUMENTS

2016/0122018 A1* 5/2016 Matsue ................ B64C 39/024
                                                    244/17.13
2016/0125746 A1* 5/2016 Kunzi ................. G05D 1/0088
                                                    701/11
2016/0137298 A1* 5/2016 Youngblood ......... B64C 39/024
                                                    244/17.23
2017/0269588 A1* 9/2017 Lema .................. B64C 39/024

* cited by examiner

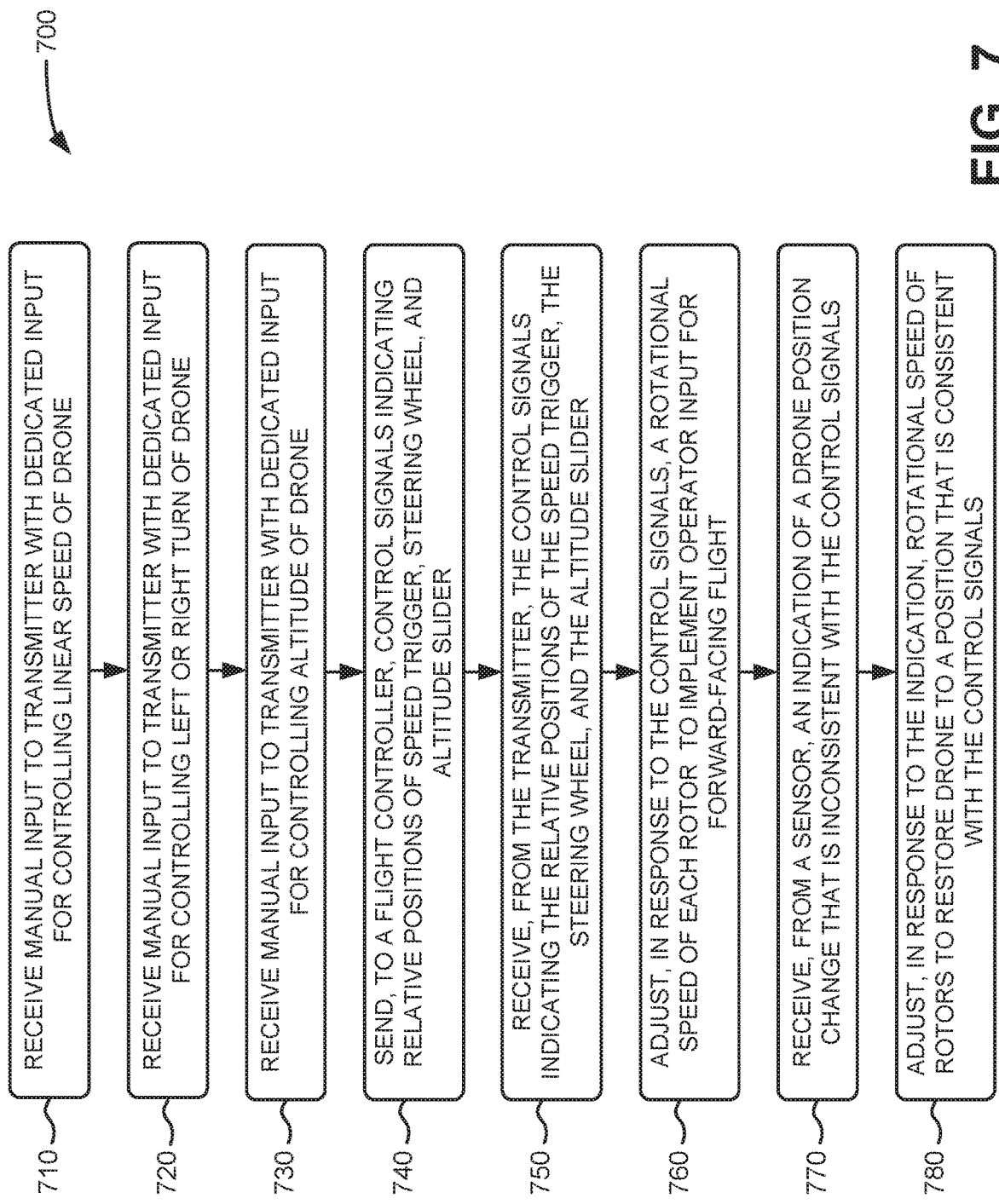

UAV FLIGHT CONTROL SYSTEM

BACKGROUND

Some types of Unmanned Aerial Vehicles (UAVs, also sometimes referred to as drones) are flown by remote human operators providing input to a remote control. A popular form function for UAVs is the multirotor aircraft, having three or more small rotors instead of one or two like the traditional helicopter. In contrast with single- and double-rotor helicopters that use variable pitch rotors for flight stability and control, multirotor aircraft use fixed-pitch blades. Thus, control of multirotor aircraft can be achieved by varying the relative speed of each rotor to change the thrust and torque produced by each rotor.

Traditionally, a typical UAV remote control (referred to herein as a "transmitter") utilizes two control sticks. Both sticks operate in the X and Y axis. A common configuration is to have the left stick operate altitude and yaw rotation, while the right stick will operate forward/reverse tilt and left/right tilt. In many instances, this traditional transmitter configuration provides effective control, including allowing the ability to fly the UAV sideways to pan. However, for some people, the traditional transmitter configuration is not natural and therefore requires a lot of time to develop the skills needed to operate a multirotor UAV.

BRIEF DESCRIPTION OF THE DRAWINGS

FIG. 7 is a flow diagram illustrating an exemplary process for controlling a UAV using a transmitter with independent speed, steering, and altitude controls, according to an implementation described herein.

DETAILED DESCRIPTION OF PREFERRED EMBODIMENTS

The following detailed description refers to the accompanying drawings. The same reference numbers in different drawings may identify the same or similar elements.

While some Unmanned Aerial Vehicles (UAVs) are intended for photography and surveillance purposes, many UAVs for the average consumer may more likely be used for general flying and racing. When used for general flying and racing, operators can apply a forward-facing orientation for the UAV typical of a car or fixed wing aircraft. For forward-facing flight control, some UAV maneuvers are especially complex when using a conventional transmitter with two control sticks. For example, controlling banked turns with a conventional transmitter for a multirotor UAV requires maintaining a forward pitch while simultaneously applying both roll and yaw in the direction of a desired turn. According to implementations described herein, a transmitter and corresponding flight controller are disclosed that provide for RC car-type steering (e.g., pistol grip) for a multirotor UAV. The transmitting controls may resemble that of a remote control car, which can be more intuitive for some UAV operators conducting forward-facing flight maneuvers.

Figure 1:
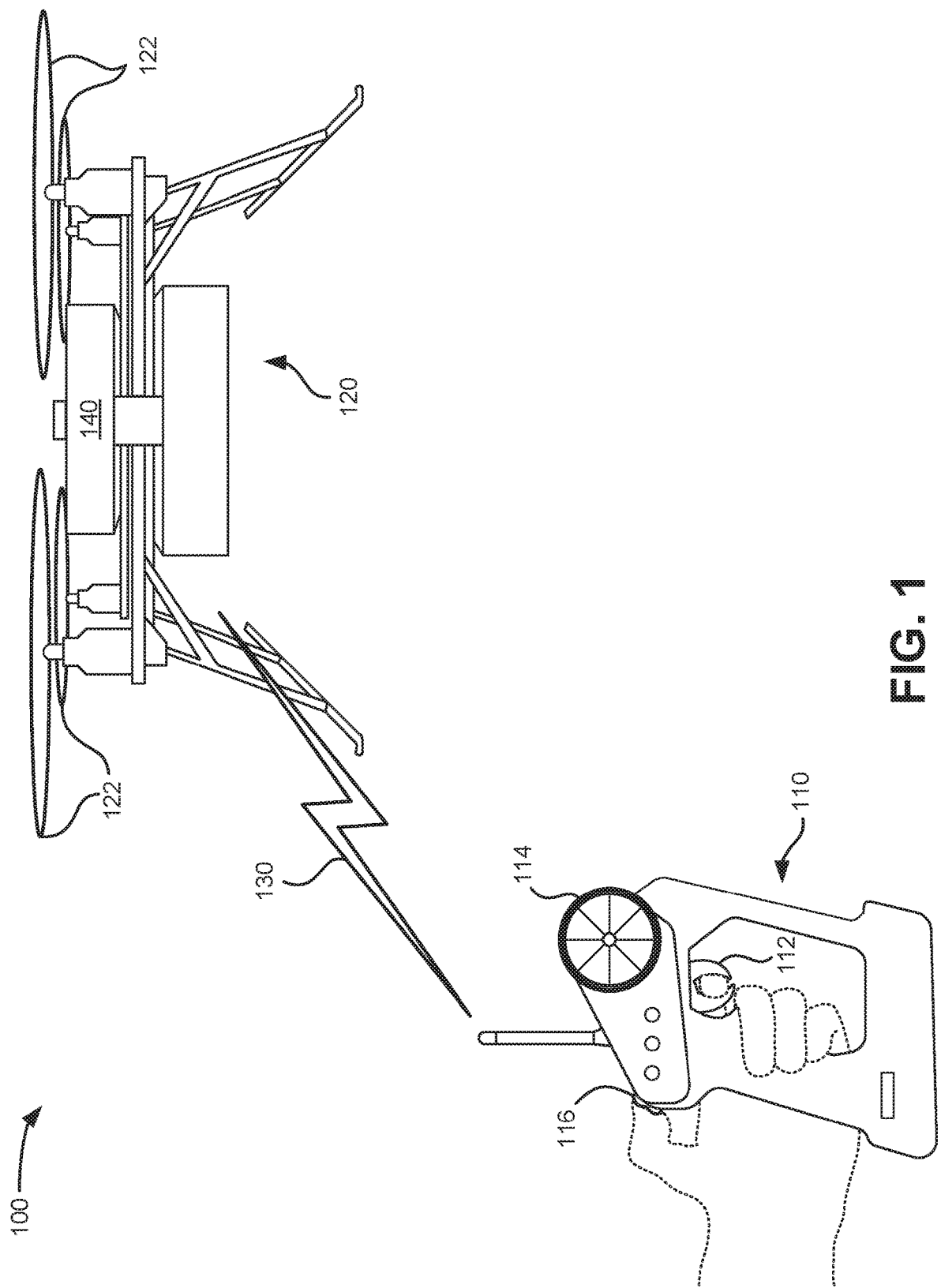
FIG. 1 is a diagram illustrating systems and/or methods described herein.

FIG. 1 is a diagram illustrating systems 100 described herein. In system 100, a transmitter 110 controls operation of a UAV 120 via signals 130.

Transmitter 110 may be held by an operator and used to control UAV 120. Generally, transmitter 110 may include a pistol-grip-style control system with an altitude control. Particularly, transmitter 110 may include a speed trigger 112, a steering wheel 114, and a thumb slider 116 as three primary controls for operation of UAV 120. User input to speed trigger 112, steering wheel 114, and thumb slider 116 may cause transmitter 110 to transmit signals 130 that can be received by components of UAV 120. For example, an operator may hold transmitter 110 in a left hand, with a left thumb on slider 116, and a left index finger on speed trigger 112. The right hand of the operator (not shown in FIG. 1) can manipulate steering wheel 114. While transmitter 110 is described herein using a left-handed hold orientation, in other implementations transmitter 110 may be configured with a right-hand orientation. In some implementations, steering wheel 114 may be positioned on transmitter 110 to be alternately accessible on either a right-handed or left-handed hold orientation.

UAV 120 may include a multirotor aircraft that that receives control signals from transmitter 110. In implementations described herein, UAV 120 may include four fixed-pitch rotors 122. In other implementations, a different number of rotors 122 (e.g., three, six, eight, etc.) may be included on UAV 120. UAV 120 may receive signals 130 from transmitter 110 to control flight of UAV 120. More particularly, the rotational speed of each rotor 122 may be adjusted individually to cause UAV 120 to perform various flight maneuvers. As described further herein, a flight controller 140 integral with UAV 120 may receive signals 130 with user input from speed trigger 112, steering wheel 114, and thumb slider 116 and convert signals 130 into rotor speed commands. UAV 120 is described further in connection with FIGS. 4 and 5.

The combination of hand-held transmitter 110 and flight controller 140 in system 100 provides intuitive control of UAV 120, especially for operators having previous experience with remote control cars. Thus, system 100 may provide a more attractive experience for forward facing flight maneuvers, such as racing-type maneuvers.

Figure 2:
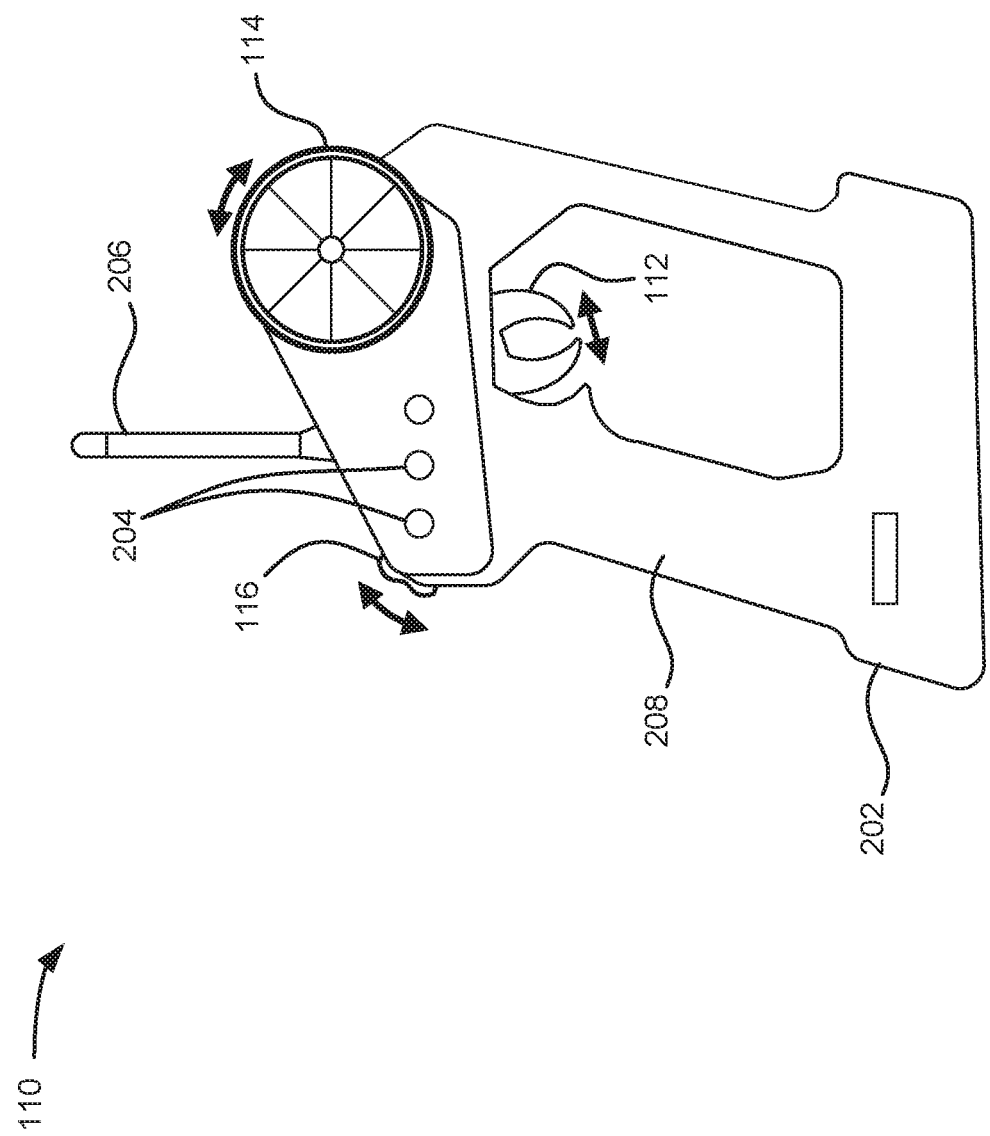
FIG. 2 is a simplified schematic illustrating exemplary external components of the transmitter of FIG. 1.

FIG. 2 is a diagram of an exemplary transmitter 110. As illustrated in FIG. 2, transmitter 110 may include speed trigger 112, steering wheel 114, and thumb slider 116, a housing 202, control button(s) 204, and antenna 206. Housing 202 may protect components of user device 210 and provide a structure for an operator to hold. For example, housing 202 may be formed from plastic, metal, or a composite, and may be configured to support speed trigger 112, steering wheel 114, thumb slider 116, control button(s) 204, and antenna 206. As shown in FIG. 2, speed trigger 112, steering wheel 114, and thumb slider 116 are dedicated controls separately located on housing 220.

In one implementation, housing 202 may include an integrated handle 208. Handle 208 may provide an area of transmitter 110 that can be gripped by the operator while simultaneously providing input to speed trigger 112, steering wheel 114, and/or thumb slider 116. More particularly, speed trigger 112, steering wheel 114, and thumb slider 116 are positioned on the housing to permit an operator to simultaneously manipulate speed trigger 112 and thumb slider 116 with one hand, and steering wheel 114 with the other hand.

Speed trigger 112 may be moved (e.g., by an operator) back and forth in a direction as shown in FIG. 2 to provide forward and reverse speed commands. "Forward" and "reverse" may be relative to a default "nose" or front of UAV 120 (such as nose indicator 602 of FIG. 6) and generally at a constant altitude. Speed trigger 112 may take the form of a lever, scrolling wheel, or any other mechanism that accepts bi-directional input. According to an implementation, speed trigger 112 may include a default neutral position. Squeezing speed trigger 112 from the neutral position may indicate an increasing degree of speed in one direction (e.g., forward). Pushing speed trigger 112 away from the neutral position may indicate an increasing degree of speed in another direction (e.g., reverse).

Steering wheel 114 may be rotated (e.g., by an operator) back and forth in a direction as shown in FIG. 2. Steering wheel 114 may provide control signals to turn UAV 120 left and right, and also to allow UAV 120 to rotate. Steering wheel 114 may take the form of a wheel, a pivoting bar, a trackpad, or any other mechanism that accepts rotational input. According to an implementation, steering wheel 114 may include a default position, and steering wheel 114 may rotate no more than 180 degrees from the default position in either a clockwise or counterclockwise direction.

Thumb slider 116 (also referred to herein as an "altitude slider") may be oriented on housing 202 to allow manual input using a different finger than used to manipulate speed trigger 112. In one implementation, thumb slider may be located on housing 202 to naturally be contacted by an operator's thumb when the operator is gripping handle 208 (and when an operator's index finger is engaged with speed trigger 112). Thumb slider 116 may take the form of a sliding button, a lever, a scrolling wheel, a trackpad, or any other mechanism that accepts bi-directional input. Thumb slider 116 may provide control signals to increase or decrease altitude of UAV 120. According to an implementation, thumb slider 116 may include a default position, such that thumb slider 116 will self-center to the default position. The default position may correspond to a stable altitude.

Control buttons 204 may permit the operator to perform one or more operations other than those performed by speed trigger 112, steering wheel 114, and thumb slider 116. For example, control buttons 204 may be used to trim (adjust) steering response, adjust throttle neutral, power transmitter 110 on/off, select transmission frequencies, etc.

Antenna 206 may include one or more antennas to transmit and/or receive RF signals over the air. Antenna 206 may, for example, receive RF signals generated by transmitter 110 based on user input (e.g., via speed trigger 112, steering wheel 114, and/or thumb slider 116) and transmit them over the air to UAV 120. In some implementations antenna 206 may receive RF signals over the air and provide them to internal components of transmitter 110. In one implementation, for example, transmitter 110 may communicate with a network and/or devices connected to a network, which in turn may communicate with UAV 120.

Figure 3:
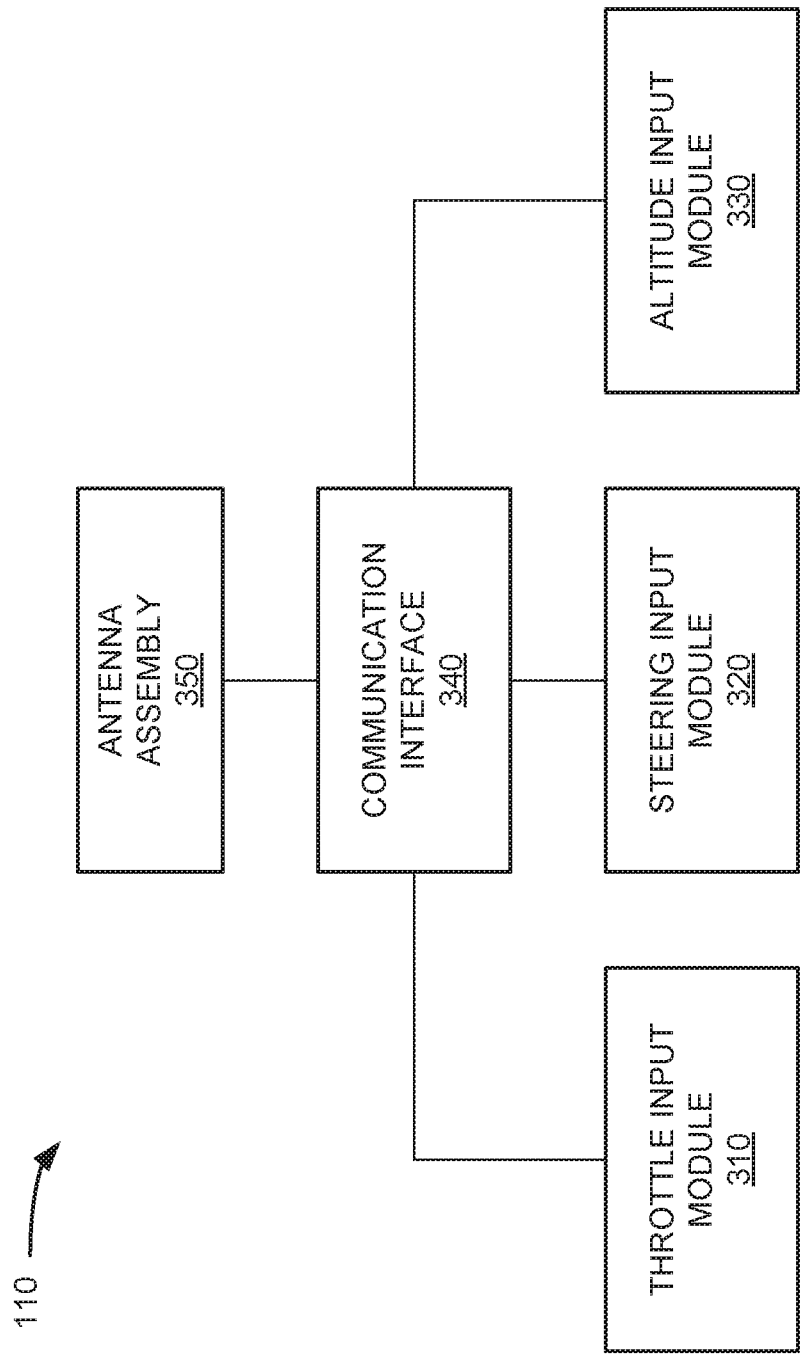
FIG. 3 is a block diagram illustrating exemplary internal components of the transmitter of FIG. 1.

FIG. 3 is a diagram illustrating exemplary components of transmitter 110 according to an implementation described herein. As shown in FIG. 2, transmitter 110 may include a throttle input module 310, a steering input module 320, an altitude input module 330, a communication interface 340, and an antenna assembly 350.

Throttle input module 310 may include an interface to receive user input from speed trigger 112, in the form of mechanical motion. Throttle input module 310 may indicate a change (or lack of change) in the position of speed trigger 112. The mechanical motion caused by an operator may change the configuration of electrical contacts, for an integrated circuit in throttle input module 310, that indicate a position of speed trigger 112. Throttle input module 310 may provide corresponding electrical signals indicative of the position of speed trigger 112 to communication interface 340.

Steering input module 320 may include an interface to receive user input from steering wheel 114, in the form of rotational motion. Steering input module 320 may indicate a position of steering wheel 114. The rotational motion of steering wheel 114 caused by an operator may change positions of electrical contacts for an integrated circuit in steering input module 320 that indicate a position of steering wheel 114. When the rotational motion changes electrical contacts for the integrated circuit, steering input module 320 provides corresponding electrical signals to communication interface 340.

Altitude input module 330 may include an interface to receive user input from thumb slider 116, in the form of linear motion. Altitude input module 330 may indicate a position of thumb slider 116. The linear motion of slider 116 caused by an operator may change the configurations of electrical contacts, for an integrated circuit in altitude input module 330, that indicate positions of thumb slider 116. When the linear motion changes electrical contacts for the integrated circuit, altitude input module 330 provides corresponding electrical signals to communication interface 340.

Communication interface 340 may include a transceiver that enables transmitter 110 to communicate with UAV 120 and/or other systems via wireless communications (e.g., radio frequency, infrared, and/or visual optics, etc.). In other implementations, communications interface 340 may use wired communications (e.g., conductive wire, twisted pair cable, coaxial cable, transmission line, fiber optic cable, and/or waveguide, etc.) or a combination of wireless and wired communications to communicate with an intermediate device that transmits signals to UAV 120. Communication interface 340 may include a transmitter that converts electrical signals to radio frequency (RF) signals. Communication interface 340 may be coupled to antenna assembly 350 for transmitting the RF signals. In one implementation, communication interface 340 may modulate signals from throttle input module 310, steering input module 320, and altitude input module 330 into a combined signal. In other implementations, communication interface 340 may forward individual signals from throttle input module 310, steering input module 320, and altitude input module 330.

In some implementations, communication interface 340 may include a logical component that includes input and/or output ports, input and/or output systems, and/or other input and output components that facilitate the transmission of data (e.g., electrical signals generated from speed trigger 112, steering wheel 114, and thumb slider 116) to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID)

interface, a NFC wireless interface, and/or any other type of interface that converts data from one form to another form.

Antenna assembly 350 may include one or more antennas (antenna 206) to transmit and/or receive RF signals. Antenna assembly 250 may, for example, receive RF signals from communication interface 340 and transmit the signals via antenna 206 to UAV 120. In some implementations, antenna assembly 350 may receive RF signals from antenna 206 and provide them to communication interface 340.

The configuration of components of transmitter 110 in FIGS. 2 and 3 are for illustrative purposes only. Other components may be included, such as a power supply, adjustment knobs, channel controls, display screens, etc. One skilled in the art will recognize that other configurations may be implemented.

Figure 4:
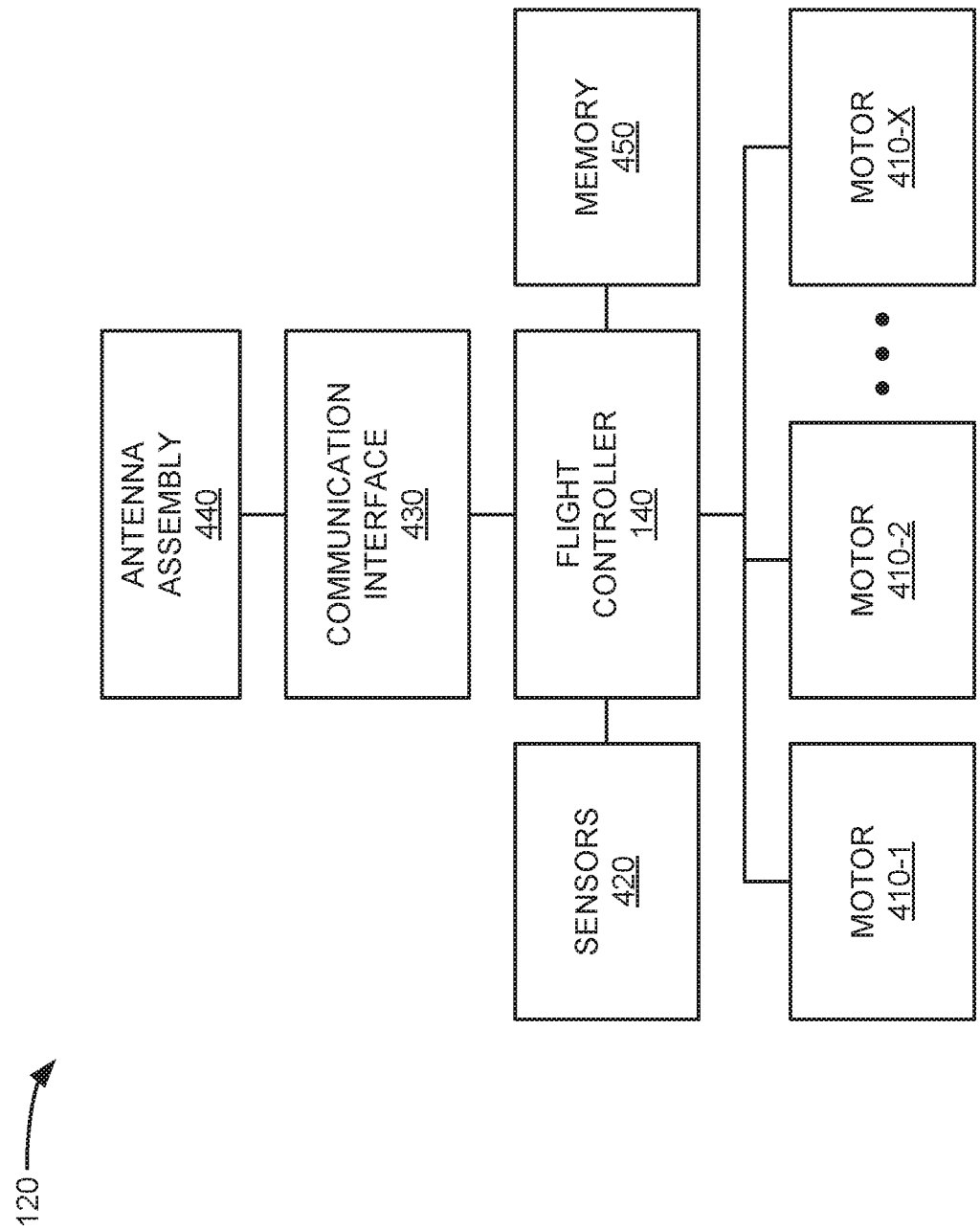
FIG. 4 is a block diagram illustrating exemplary components of the UAV of FIG. 1.

FIG. 4 is a block diagram illustrating exemplary components of UAV 120. As shown in FIG. 4, UAV 120 may include motors 410-1 through 410-X, where X is a number greater than three (referred to herein collectively as "motors 410" and generically as "motor 410"). Each of motors 410 may correspond to one of rotors 122 of FIG. 1. Still referring to FIG. 4, UAV 120 may also include flight controller 140, sensors 420, a communication interface 430, an antenna assembly 440, and a memory 450.

Each motor 410 may be connected to a fixed-pitch propeller of rotor 122. Each motor 410 may function individually to provide a rotation speed and direction for one of rotors 122.

Sensors 420 may include multiple sensors to indicate a location, speed, altitude, and orientation of UAV 120. Sensors 420 may include, for example, gyro sensors to detect pitch, roll, and yaw for UAV 120. Sensors 420 may also include accelerometers to detect acceleration of UAV 120 in three dimensions (e.g., along an x-, a y-, and a z-axis), a speedometer to detect linear speed, and an altimeter to detect altitude. In some implementations, sensors 420 may also include a global positioning system (GPS).

Communication interface 430 may include a transceiver that enables UAV 120 to communicate with transmitter 110 and/or other systems via wireless communications (e.g., radio frequency, infrared, and/or visual optics, etc.). Communication interface 430 may include a transmitter that converts radio frequency (RF) signals to electrical signals. Communication interface 430 may be coupled to antenna assembly 440 for receiving the RF signals.

In some implementations, communication interface 430 may include a logical component that includes input and/or output ports, input and/or output systems, and/or other input and output components that facilitate receiving data from other devices (e.g., RF signals from transmitter 110). For example, communication interface 430 may include a wireless network interface card for wireless communications. In one example, the wireless network interface may connect to a radio access network (RAN) for flight controller 140. The RAN may correspond to a broadband cellular network (also referred to as a mobile broadband network), such as a long-term evolution (LTE) network, an enhanced high-rate packet data (eHRPD) network, a WiMax network, etc. Communication interface 430 may also include a universal serial bus (USB) port for communications over a cable, a Wi-Fi™ interface, a Bluetooth™ wireless interface, a radiofrequency identification (RFID) interface, a NFC wireless interface, and/or any other type of interface that converts data from one form to another form.

Antenna assembly 440 may include one or more antennas to transmit and/or receive RF signals. Antenna assembly 440 may, for example, receive RF signals from transmitter 110 and provide them to communication interface 430. In some implementations, antenna assembly 440 may receive RF signals from communication interface 430 and transmit the signals to transmitter 110 or a network device.

Memory 450 may include any type of dynamic storage device that may store information and instructions, for execution by flight controller 140, and/or any type of non-volatile storage device that may store information for use by flight controller 140.

Flight controller 140 may include one or more processors, microprocessors, or processing logic that may interpret and execute instructions to interpret control signals from transmitter 110 into rotor speed commands. In one implementation, flight controller 140 may be a retrofit (or interchangeable) component of UAV 120, such that a UAV with a conventional controller may be re-configured to accept signals from transmitter 110. In other implementations, flight controller 140 may include logic (e.g., stored in memory 450) to accept signals from either transmitter 110 or a conventional (i.e., two-joystick) transmitter. For example, flight controller 140 may include a switch to allow an operator to selectively choose which type of transmitter to use with UAV 120. Flight controller 140 is described further in connection with FIG. 5, which is a diagram of exemplary logical components of flight controller 140.

Figure 5:
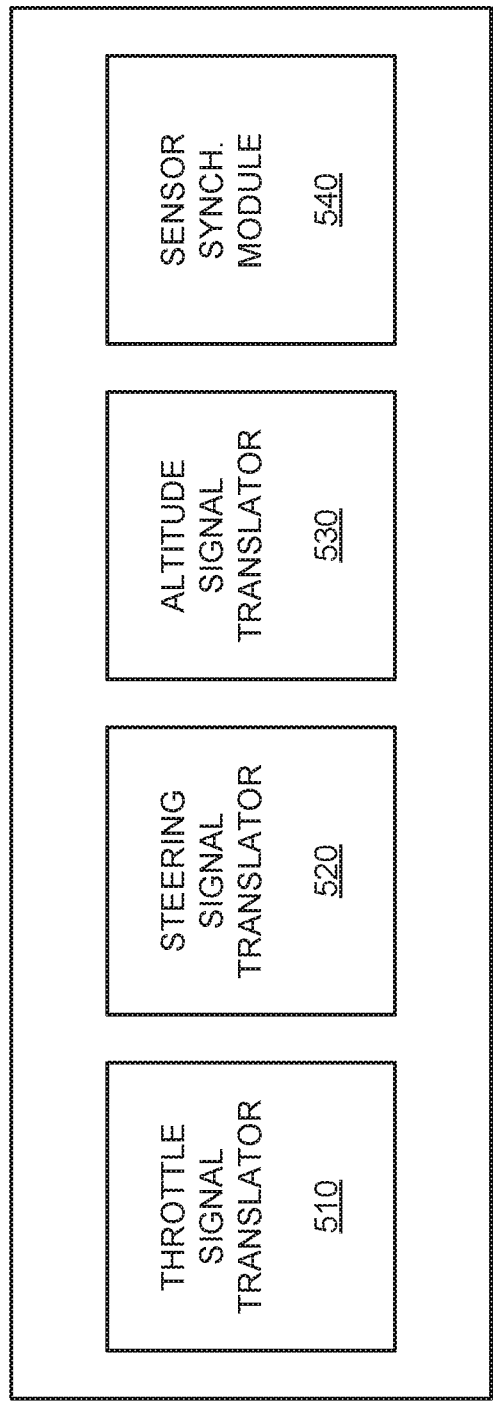
FIG. 5 is a diagram of functional components of the flight controller of FIG. 4.

Referring to FIG. 5, flight controller 140 may include a throttle signal translator 510, steering signal translator 520, an altitude signal translator 530, and a synchronization module 540. Throttle signal translator 510 may receive throttle signals generated by transmitter 110 (e.g., throttle input module 310) that reflect the position of speed trigger 112. In response to the throttle position signals, throttle signal translator 510 may generate rotor speed commands to control motors 410/rotors 122 consistent with operator throttle input.

Steering signal translator 520 may receive steering signals generated by transmitter 110 (e.g., steering input module 320) that reflect the position of steering wheel 114. In response to the steering wheel position signals, steering signal translator 520 may generate rotor speed commands to control motors 410/rotors 122 consistent with operator steering input.

Altitude signal translator 530 may receive altitude signals generated by transmitter 110 (e.g., altitude input module 330) that reflect the position of thumb slider 116. In response to the thumb slider position signals, altitude signal translator 530 may generate rotor speed commands to control motors 410/rotors 122 consistent with operator altitude input.

Synchronization module 540 may process rotor speed commands from throttle signal translator 510, steering signal translator 520, and altitude signal translator 530 and monitor readings from sensors 420 to implement operator input. For example, during flight operations, the accelerations, angles, altitude, linear velocity, and angular velocities are continually monitored by sensors 420 (e.g., an altimeter, accelerometers, speedometer, and gyro sensor) and the sensor readings are used by synchronization module 540 to adjust speeds of rotors 122 to compensate for altitude variations, drift, speed variations, tilt, etc. When synchronization module 540 receives an indication of a UAV position change that is inconsistent with signals 130 from speed trigger 112, steering wheel 114, or thumb slider 116, synchronization module 540 may automatically adjust the rotational speed of one or more rotors 122 to restore UAV 120 to a position that is consistent with the control signals. Generally, corrective responses to each sensor reading can be implemented independently of each other.

Flight controller 140 will generally process signals from transmitter 110 as follows:

(a) Speed trigger controls. When speed trigger 112 is in the neutral position, flight controller 140 will control motors 410 such that UAV 120 will remain stationary (e.g., hover in a consistent location). In one implementation, transmitter 110 may not transmit a throttle position signal when speed trigger 112 is in the neutral position. The absence of a throttle signal may be interpreted by flight controller 140 as a stationary command. Using, for example, an operator's index finger, pulling the trigger will provide a command to increase rotor speed. The further the pull distance of speed trigger 112, the larger the throttle input and the faster the forward movement. Releasing the throttle to neutral will signal UAV 120 to stop in a controlled, practically level fashion. Likewise, pushing the speed trigger 112 forward from neutral will transmit a command for reverse flight by UAV 110. If UAV 120 is moving forward (e.g., in response to a pull on speed trigger 112) and suddenly speed trigger 112 is pushed forward to indicate a reverse direction, UAV 112 will perform an 'air brake' and stop the UAV as quickly as possible before reversing direction. In one aspect, an air brake command from speed trigger 112 will induce a relatively large pitch angle to stop UAV 120 quickly.

(b) Steering wheel controls. When UAV 120 is stationary (e.g., speed trigger 112 is in the neutral position), turning steering wheel 114 will cause UAV 120 to rotate in place, such that the farther steering wheel 114 is rotated in either direction, the faster UAV 120 will rotate. If UAV 120 is moving at a speed (e.g., speed trigger 112 is pushed forward or backward from the neutral position), flight controller 140 will control motors 410 to start introducing an increasing amount of pitch and roll in order to induce a controlled banked turn. The faster UAV 120 is moving, the greater the angle of banking. The angle of banking is also dependent on how far the steering wheel 114 is turned. Thus, for instance, if UAV 120 is travelling quickly in a straight line when the operator turns steering wheel 114 hard right (e.g., in a clockwise direction), flight controller 140 will cause UAV 120 to make a very steep banked turn to try to turn as quickly as possible. If the operator has steering wheel 114 turned hard right in a fast banking maneuver, but then backs off the throttle (speed trigger 112), flight controller 140 will proportionately back off the banking angle. In all cases, flight controller 140 will keep the nose of UAV 120 up and level with the ground.

(c) Thumb slider controls. Thumb slider 116 will self-center to a neutral position which correlates to maintaining a stable altitude hold. As the operator pushes thumb slider 116 up/forward, UAV 120 will increase altitude. The further up thumb slider 116 is pushed by the operator, the faster the altitude gain will be. Releasing thumb slider 116 will return thumb slider 116 back to the neutral position and hold the new altitude. Similarly, moving thumb slider 116 down/backward will decrease altitude of UAV 120 accordingly. Even in a turn (initiated by input to steering wheel 114), moving thumb slider 116 will change the altitude, as flight controller 140 will make the necessary adjustment to the speeds of motors 410 automatically.

FIGS. 4 and 5 show exemplary components of UAV 120. In other implementations, UAV 120 may include fewer components, different components, or additional components than those depicted in FIGS. 4 and 5.

Figure 6A:
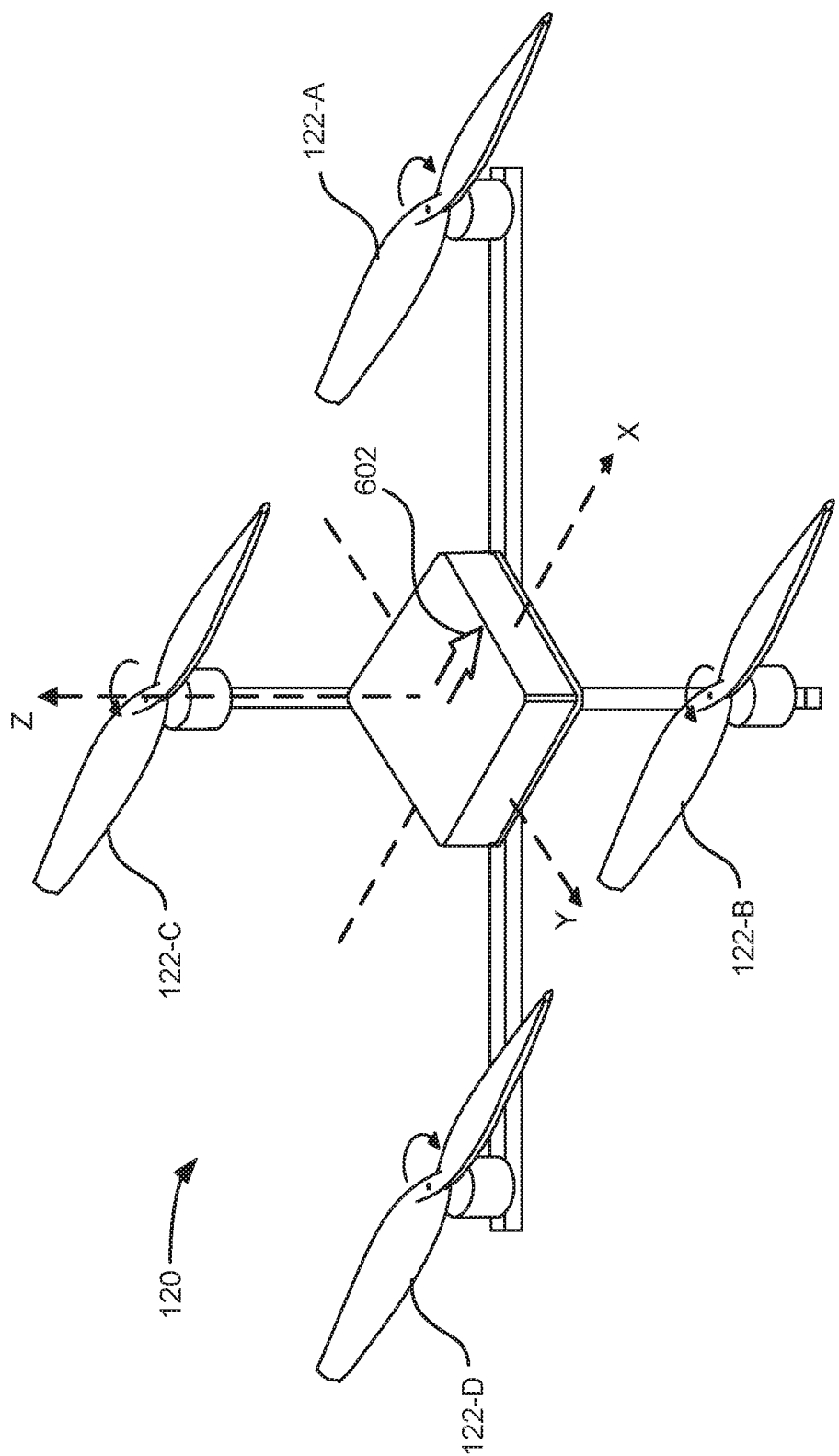
FIG. 6A is a simplified perspective view of a UAV with four rotors, according to an implementation described herein.
Figure 6C:
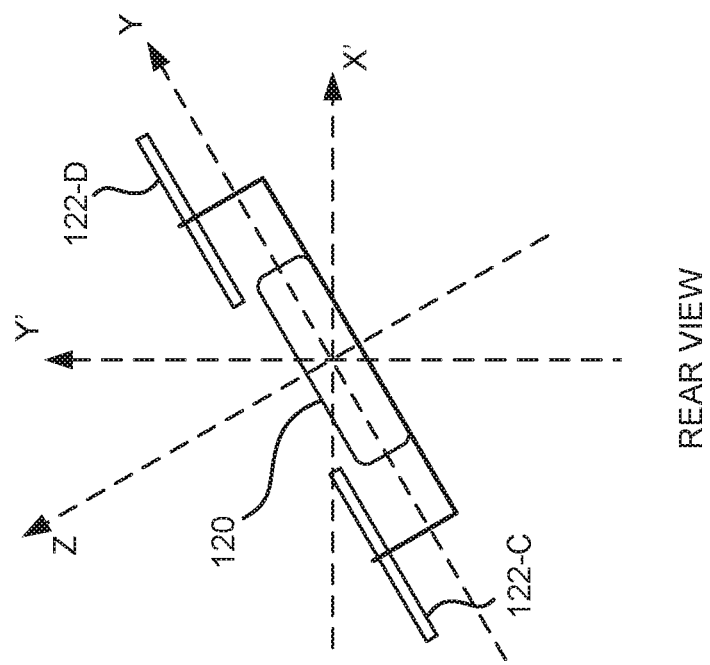
FIG. 6C is a simplified rear view of the UAV of FIG. 6 in a banked turn orientation.
Figure 6B:
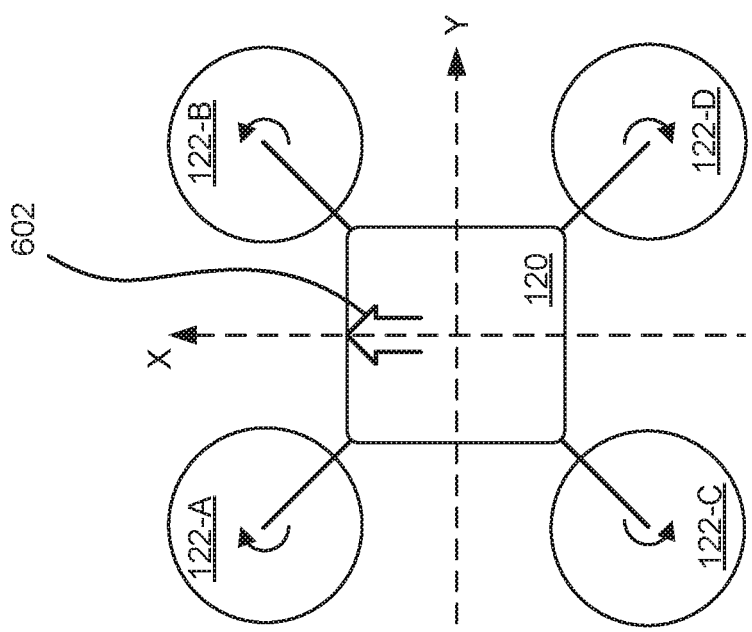
FIG. 6B is a simplified top view of the UAV of FIG. 6 in a non-turn orientation.

FIG. 6A is a perspective view of UAV 120 with four rotors. FIG. 6B is a simplified top view UAV 120 in a non-turn orientation. FIG. 6C is a simplified rear view of UAV 120 in a banked turn orientation. FIGS. 6A-6C are referred to below to provide a high-level description of how system 100 performs a controlled turn of UAV 120 based on user input to transmitter 110.

As shown in FIG. 6A, UAV 120 may be configured with a forward facing orientation, as indicated by nose indicator 602. Assume in FIG. 6A that UAV 120 hovers at an altitude above and essentially parallel to the ground. Thus, speed trigger 112, steering wheel 114, and thumb slider 116 of transmitter 110 (shown in FIG. 2) may each be in a default position. To maintain altitude without forward motion or rotation, flight controller 140 will cause rotors 122-A and 122-D to spin in one direction (clockwise), and rotors 122-B and 122-C to spin in the opposite direction (counterclockwise).

Operator input to squeeze speed trigger 112 will cause flight controller 140 to increase the rotational speed of at least some rotors 122 (e.g., rotors 122-C and 122-D) to propel UAV 120 forward along the X-axis in the orientation shown in FIGS. 6A and 6B (e.g., at a constant altitude).

While UAV 120 is moving forward in this orientation, the operator turns steering wheel 114 for a 30-degree left turn (e.g., counterclockwise). In response to the corresponding signal from transmitter 110, flight controller 140 accelerates rotation of rotors 122-B and 122-D so that UAV 120 starts to spin around the X-axis, as shown from the rear view of FIG. 6C. The tilt of UAV 120 reduces the vertical component of thrust from all rotors 122. Thus, if UAV 120 starts losing altitude, flight controller 140 increases the rotational speed of all rotors 122 to regain altitude.

FIG. 6C shows that forces generated by rotors 122 are along the Z-axis with two components in the X' and Y' directions. The component in the Y'-direction is controlled by the altitude controller (e.g., input from thumb slider 116) and therefore the Y' component determines the X' component. Sensors 420 (e.g., accelerometer) detect the force in the X' direction, and flight controller 140 takes action by increasing the thrust in rotors 122-A and 122-B (to initiate the curve) and at the same time reducing the thrust in rotors 122-C and 122-D. If sensors 420 detect that UAV 120 starts losing or gaining altitude, the flight controller 140 will adjust the rotation speed of all rotors 122 equally to compensate.

Because the thrust of rotors 122-A and 122-B is greater than the thrust from rotors 122-C and 122-D, torque is generated around the Y-axis of UAV 120. The torque has a component in the Y'-direction and a component in X'-direction. The torque around Y' creates an angular acceleration around Y', which starts the desired turn for UAV 120. Once the angular velocity of the turn compensates for the acceleration in the X'-direction then flight controller 140 equalizes all rotors 122 and the process repeats.

The final component to account for is the torque in X' which causes UAV 120 to spin around X'. At this point, UAV 120 has rotors 122-A and 122-B spinning faster than rotors 122-C and 122-D. Thus, flight controller 140 will command either rotor 122-B to go faster or rotor 122-C to go slower to create an imbalance in the angular momentum generated by rotors 122 that allows UAV 120 to counter the spin around X'.

So during the banked turn exhibited in FIG. 6C, all four rotors 122 are spinning at different speeds, but in such a way that: (1) the forces on the Y' direction keep the UAV at the proper altitude; (2) the forces on the X' direction are compensated by the curve (spin around Y'); and (c) the spin around X' is compensated by the angular momentum imbalance from the different spin velocities of each rotor 122.

During the turn, the accelerations, angles, altitude, and linear and angular velocities are constantly monitored by sensors 420 (e.g., altimeter, accelerometer, speedometer, and gyro sensor) and the sensor readings cause flight controller 140 to actuate rotors 122 to compensate accordingly. Since all elements overlap linearly, flight controller can act upon each sensor reading independently of the other sensor readings.

The above approach described in connection with FIGS. 6A-6C applies to a banked turn without "sliding" where flight controller 140 tries to cancel out all accelerations of UAV 120. Assuming a constant linear velocity forward, a steeper turn angle will require a higher angular velocity to compensate: the higher the angular velocity, the smaller the radius and therefore a "sharper" turn.

FIG. 7 is a flow diagram of an exemplary process 700 for controlling a UAV using a transmitter with independent speed, steering, and altitude controls, according to implementations described herein. In one implementation, process 700 may be performed by transmitter 110 and flight controller 140. In another implementation, some or all of process 700 may be performed by another device or group of devices. For example, in one implementation, another intermediate device in a network (such as a component in a cellular network) may perform one or more parts of process 700.

Process 700 may include receiving manual input to a transmitter with dedicated input for controlling a linear speed of a UAV (block 710), receiving manual input to the transmitter with dedicated input for controlling a left or right turn of the UAV (block 720), and receiving manual input to the transmitter with dedicated input for controlling a flying altitude of the UAV (block 730). For example, an operator holding transmitter 110 may apply force from an index finger to change a position of speed trigger 112, may turn steering wheel 114, and may use a thumb to adjust the position of thumb slider 116.

Process 700 may further include sending, to a flight controller, control signals indicating relative positions of the speed trigger, the steering wheel, and the altitude slider (block 740) and receiving, from the transmitter, the control signals indicating the relative positions of the speed trigger, the steering wheel, and the altitude slider (block 750). For example, transmitter 110 may detect the position of speed trigger 112, steering wheel 114, and thumb slider 116 and provide signals 130 to UAV 120 indicating the position of speed trigger 112, steering wheel 114, and thumb slider 116. Signals 130 may be received by flight controller 140.

Process 700 may additionally include adjusting, in response to the control signals, a rotational speed of each rotor of the UAV to implement the operator input for forward-facing flight (block 760). For example, flight controller 140 may convert signals 130 into rotor speed commands that accomplish the forward/reverse motion, forward-/rear-facing turns, and altitude adjustments indicated by the operator input of process blocks 710-730.

Process 700 may additionally include receiving, from a sensor, an indication of a UAV position change that is inconsistent with the control signals (block 770) and adjusting, in response to the indication, the rotational speed of one of the rotors to restore the UAV to a position that is consistent with the control signals (block 780). For example, sensors 420 may provide input of a position change to UAV 120 (e.g., loss of altitude, drift, loss of speed, etc.) that was not indicated by signals 130. For example, flight controller 114 may implement a turning command from steering wheel 114 that initially causes a loss of altitude, even though thumb slider 116 is in a neutral position. Flight controller 140 may automatically alter the rotational speed of one or more rotors 122 to compensate for the position change and restore UAV 120 to the position indicated by the control signals 130.

According to implementations described herein, a system may include a UAV with at least three rotors, a flight controller for the UAV, and a transmitter to receive operator input for controlling the UAV. The transmitter includes (1) a speed trigger for controlling a linear speed of the UAV, (2) a steering wheel for performing left or right turns by the UAV, (3) an altitude slider for controlling a flying altitude of the UAV, and (4) a communication interface to send control signals indicating relative positions of the speed trigger, the steering wheel, and the altitude slider. The flight controller may include a processor to receive, from the transmitter, the control signals indicating the relative positions of the speed trigger, the steering wheel, and the altitude slider; and adjust, in response to the control signals, a rotational speed of each rotor independently to implement the operator input for forward-facing flight.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 6, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A system, comprising:
    an unmanned aerial vehicle (UAV) including at least three rotors, an altimeter, one or more accelerometers, a gyro sensor, and a flight controller; and
    a transmitter to receive operator input for controlling the UAV with a forward-facing flight orientation, the transmitter including:
        a housing with a grip handle configured to be gripped by an operator,
        a speed trigger, mounted on the housing and positioned by manual input, wherein the speed trigger receives first bi-directional input to control a linear speed of the UAV, a steering wheel, mounted on the housing and positioned by manual input, wherein the steering wheel receives rotational input to control left or right turns by the UAV,
an altitude slider, mounted on the housing and positioned by manual input, wherein the altitude slider receives second bi-directional input to control a flying altitude of the UAV, and
a first communication interface including a first transceiver to send control signals to the flight controller, the control signals indicating a position of the speed trigger, a position of the steering wheel, and a position of the altitude slider,
wherein the flight controller includes:
a second communication interface including a second transceiver to receive the control signals from the transmitter indicating the position of the speed trigger, the position of the steering wheel, and the position of the altitude slider, and
one or more processors to:
independently adjust, in response to the control signals, a rotational speed of each rotor to implement the operator input for the forward-facing flight orientation, wherein when the control signals indicate that the position of the speed trigger is a neutral position and that the position of the steering wheel is turned from a default position, the rotational speed of one of the at least three rotors is changed to cause the UAV to rotate in place,
receive, from the one or more accelerometers, an indication of a UAV position change that is inconsistent with the control signals, and
automatically adjust, in response to the indication, the rotational speed of one of the at least three rotors to restore the UAV to a UAV position that is consistent with the control signals.

2. The system of claim 1, wherein the UAV further comprises a nose with a nose indicator that indicates the forward facing orientation.

3. The system of claim 1, wherein the speed trigger and the altitude slider are positioned on the housing to permit an operator to simultaneously manipulate the speed trigger and the altitude slider with one hand.

4. The system of claim 3, wherein the speed trigger, the steering wheel, and the altitude slider are configured to be manipulated using different fingers of the operator.

5. The system of claim 3, wherein the speed trigger, the steering wheel, and the altitude slider are dedicated control components separately located on the housing.

6. The system of claim 3, wherein the grip handle, the speed trigger, and the altitude slider are configured to be manipulated with one hand of the operator, and wherein the steering wheel is configured to be manipulated using an opposite hand of the operator.

7. The system of claim 1, wherein the UAV includes fixed-pitch rotors.

8. The system of claim 1, wherein the UAV further comprises a speedometer, wherein the speedometer detects a linear speed of the UAV.

9. The system of claim 1, wherein the flight controller is a retrofit component for the UAV.

10. A method, comprising:
receiving, via a speed trigger of a transmitter, manual input for controlling a linear speed of an unmanned aerial vehicle (UAV), wherein the UAV includes at least three rotors, an altimeter, one or more accelerometers, a gyro sensor, and a flight controller;
receiving, via a steering wheel of the transmitter, manual input for controlling a left or right turn of the UAV;
receiving, via an altitude slider of the transmitter, manual input for controlling a flying altitude of the UAV;
sending, by the transmitter and to the flight controller for the UAV, control signals indicating a position of the speed trigger, a position of the steering wheel, and a position of the altitude slider;
receiving, by the flight controller and from the transmitter, the control signals indicating the position of the speed trigger, the position of the steering wheel, and the position of the altitude slider;
independently adjusting, by the flight controller and in response to the control signals, a rotational speed of each rotor, of the at least three rotors, of the UAV to implement operator input for a forward-facing flight orientation, wherein when the control signals indicate that the position of the speed trigger is a neutral position and that the position of the steering wheel is turned from a default position, the rotational speed of one of the at least three rotors is changed to cause the UAV to rotate in place;
receiving, by the flight controller and from the one or more accelerometers, an indication of a UAV position change that is inconsistent with the control signals; and
automatically adjusting, by the flight controller and in response to the indication, the rotational speed of one of the at least three rotors to restore the UAV to a UAV position that is consistent with the control signals.

11. The method of claim 10, wherein independently adjusting a rotational speed of each rotor of the UAV, further comprises:
generating rotor speed commands to control each rotor of the at least three rotors consistent with the control signals.

12. The method of claim 10, wherein automatically adjusting the rotational speed, further comprises:
adjusting, by the flight controller and in response to the indication, the rotational speed of each of the at least three rotors to restore the UAV to the flying altitude.

13. The method of claim 10, further comprising:
receiving, by the flight controller and from the gyro sensor, an indication of an angular velocity change of the UAV that is inconsistent with the position of the steering wheel.

14. The method of claim 10, further comprising:
receiving, by the flight controller and from the altimeter, an indication of an altitude change that is inconsistent with the position of the altitude slider.

15. A non-transitory computer-readable medium storing instructions executable by a computational device to:
receive, from a transmitter, a first control signal, the first control signal indicating a position of a speed trigger on the transmitter for controlling a linear speed of an unmanned aerial vehicle (UAV), wherein the UAV includes at least three rotors, an altimeter, one or more accelerometers, a gyro sensor, and a flight controller;
receive, from the transmitter, a second control signal, the second control signal indicating a position of a steering wheel on the transmitter for controlling a left or right turn of the UAV;
receive, from the transmitter, a third control signal, the third control signal indicating a position of an altitude slider on the transmitter for controlling a flying altitude of the UAV;

independently adjust, in response to the first control signal, the second control signal, and the third control signal, a rotational speed of each rotor, of the at least three rotors of the UAV, to implement operator input for a forward-facing flight orientation, wherein when the first control signal indicates that the position of the speed trigger is a neutral position and the second control signal indicates that the position of the steering wheel is turned from a default position, the rotational speed of one of the at least three rotors is changed to cause the UAV to rotate in place;

receive, from the one or more accelerometers, an indication of a UAV position change that is inconsistent with one or more of the first control signal, the second control signal, or the third control signal; and automatically adjust, in response to the indication, the rotational speed of one of the at least three rotors to restore the UAV to a UAV position that is consistent with the control signals.

16. The non-transitory computer-readable medium of claim 15, wherein the first control signal, the second control signal, and the third control signal are independent signals.

17. The non-transitory computer-readable medium of claim 15, further comprising instructions to:

generate rotor speed commands to control each rotor of the at least three rotors consistent with the first control signal, the second control signal, and the third control signal.

18. The non-transitory computer-readable medium of claim 15, further comprising instructions to:

receive, from the altimeter, an indication of a UAV position change that is inconsistent with one or more of the first control signal, the second control signal, or the third control signal.

19. The non-transitory computer-readable medium of claim 15, further comprising instructions to:

receive, from the gyro sensor, an indication of a UAV position change that is inconsistent with one or more of the first control signal, the second control signal, or the third control signal.

* * * * *